April 1, 1924.

D. COLLINS

VEHICLE WHEEL

Filed July 31, 1922

1,489,193

Daniel Collins INVENTOR

BY Victor J. Evans

ATTORNEY

WITNESS: E. J. Worden

Patented Apr. 1, 1924.

1,489,193

UNITED STATES PATENT OFFICE.

DANIEL COLLINS, OF BROOKLYN, NEW YORK.

VEHICLE WHEEL.

Application filed July 31, 1922. Serial No. 578,688.

*To all whom it may concern:*

Be it known that I, DANIEL COLLINS, a citizen of the United States, residing at Brooklyn, in the county of Kings and State of New York, have invented new and useful Improvements in Vehicle Wheels, of which the following is a specification.

This invention relates to vehicle wheels.

More particularly the invention relates to the type of vehicle wheel disclosed in a patent granted to me October 11, 1921, No. 1,393,504.

Some of the objects of the present invention are: to obviate the use of pneumatic tires; to produce a vehicle wheel having the attributes of a wheel equipped with a pneumatic tire and being comparatively practical in connection with vehicle driving axles; to produce a wheel which absorbes torsional and radial strains and which embodies means for distributing stresses to its parts; and with these and other objects in view the invention resides in the particular provision, relative disposition and functions of parts hereinafter fully described and illustrated in the accompanying drawing, in which:

Figure 1:
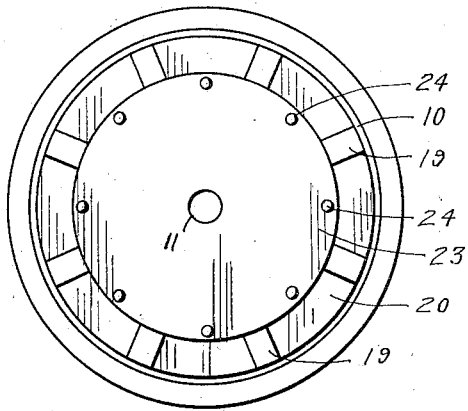
Figure 1 is a side elevation of the wheel.
Figure 2:
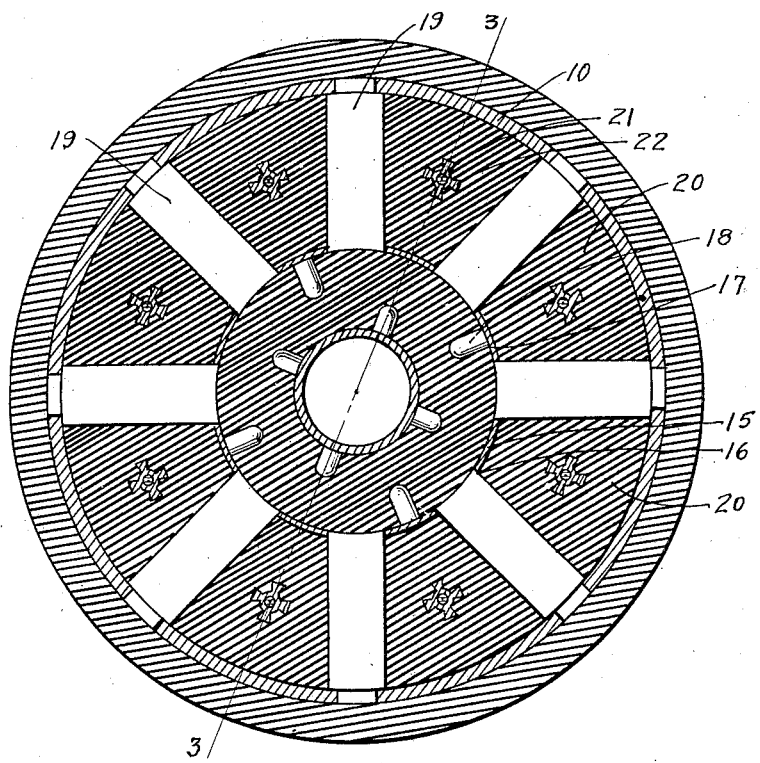
Figure 2 is a longitudinal sectional view of the wheel.
Figure 3:
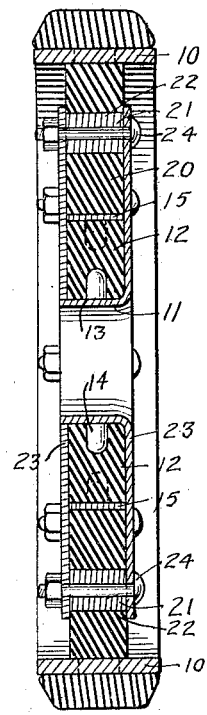
Figure 3 is a sectional view taken on the line 3—3, Figure 1.

Referring now more particularly to the several views of the drawing for the details, it will be apparent that, the wheel of the present invention will include a felly 10 upon which a tire is supported, and a hub 11 between which and the felly, shock and strain absorbing means, and stress distributing means are employed. To these ends a disk 12 is employed. The disk 12 is made preferably of rubber, and it has a central opening therein to accommodate the hub 11, and recesses 13 radially disposed at said central opening, accommodate projections 14 on the hub 11. The projections 14 in the recesses 13 prevent the turning of the disk 12 with respect to the hub 11. A ring 15 having holes 16 therein surrounds the disk 12 in fitting relation. The periphery of the disk 12 has recesses 17 which accommodate projections 18 on the ring 15. The projections 18 in the recesses 17 prevent the turning of the ring 15 with respect to the disk 12. Extending inwardly radially from the felly is a plurality of members 19. Any desired number of members 19 may be employed, and they may be of any desired material—the members being preferably of wood, and square in cross section. The inner ends of the members normally contact the disk 12 and extend through the holes 16 in the ring 15. Resilient elements 20 of rubber or the like are arranged between the members 19, and normally contact the ring 15, members 19 and the felly 10. Each of the elements 20 embodies a bushing 21. Each bushing 21 has radial projections 22 which are accommodated in recesses in the element 20 to prevent turning of the bushing with respect to element 20. Side plates 23, 23 are attached to the hub 11, and if desired one of the plates may be formed integral with the hub, while the other plate may be detachable as shown. The plates 23, 23 serve to confine the disk 12, the ring 15 and to some extent the elements 20. The outer marginal portion of each of the plates 23, 23, has a series of holes to receive bolts. In the assemblage of the parts, the bolts 24 are placed in the bushings 21, and the opposite ends of each bolt extend through alined holes of the two plates 23, after which nuts may be applied to the extremities of each bolt. Where stud bolts are used the same may first be passed through the holes in one plate 23, through the bushings and then through the holes in the other plate 23, after which the removable nut may be screwed onto each bolt.

From the foregoing it will be manifest that, by virtue of the disk 12, ring 15, members 19, and the resilient elements 20, as disposed between the felly and the hub, shocks and strains due to contact of the tread portions of the wheel with the road surface irregularities, will be readily absorbed; and that torsional stress through the hub will be equally distributed by virtue of the plates 23, 23, bushings 21, and bolts 24 as employed.

It is to be understood that minor changes, alterations and modifications, within the scope of the claims hereunto appended may be resorted to whenever it is deemed necessary or desirable.

What is claimed is:

1. A vehicle wheel comprising a hub, a felly, members extending radially from said felly, means for yieldingly supporting the inner ends of said members, yieldable elements filling the space between said members, and means connecting said hub and said yieldable elements.

2. A vehicle wheel comprising a hub, a felly, members extending radially from said felly, means for yieldingly supporting the inner ends of said members, resilient elements filling the space between said members, side plates attached to said hub, and bolts carried by the outer marginal portions of said side plates, the said bolts passing through said resilient elements.

3. A vehicle wheel comprising a hub, a felly, members extending inwardly radially from said felly, means for yieldingly supporting the inner ends of said members, resilient elements between said members and filling the space therebetween, side plates attached to said hub, each of said resilient elements having a bushing, and a bolt passing through each of said bushings and connecting said side plates.

4. A vehicle wheel comprising a hub, a felly, members extending inwardly radially from said felly, a cushioning disk held against turning movement around said hub, the inner ends of said members normally contacting said disk, a ring having holes therein surrounding said disk, the inner ends of said members extending in said holes, means preventing the ring from turning relatively to said disk, resilient elements between said members which normally contact said ring and said felly, and means for connecting said hub to said resilient elements.

5. A vehicle wheel comprising a hub, a felly, members extending inwardly radially from said felly, a cushioning disk held against turning movement around said hub, the inner ends of said members normally contacting said disk, resilient elements between said members, the said members normally contacting said members and said felly, and means for connecting said hub to said resilient elements.

In testimony whereof I hereby affix my signature.

DANIEL COLLINS.